United States Patent [19]
Ohtomo et al.

[11] Patent Number: 5,583,685
[45] Date of Patent: Dec. 10, 1996

[54] MARKING APPARATUS HAVING FEEDBACK-CONTROLLED ROTATIONAL LASER BEAM

[75] Inventors: Fumio Ohtomo; Hiroyuki Nishizawa; Jun-ichi Kodaira; Kenichirou Yoshino, all of Tokyo, Japan

[73] Assignee: Topcon Corporation, Tokyo, Japan

[21] Appl. No.: 511,619

[22] Filed: Aug. 7, 1995

Related U.S. Application Data

[63] Continuation of Ser. No. 141,047, Oct. 26, 1993, Pat. No. 5,517,023.

[30] Foreign Application Priority Data

Oct. 27, 1992 [JP] Japan .................................. 4-289042

[51] Int. Cl.$^6$ ................................................ G02B 26/08
[52] U.S. Cl. ........................ 359/197; 359/211; 250/234; 250/235
[58] Field of Search .................... 359/196–226, 359/529, 534, 536; 347/224, 225, 241–243, 256–261, 110; 250/234–236; 235/463, 466–467, 470, 472

[56] References Cited

U.S. PATENT DOCUMENTS

| | | |
|---|---|---|
| 3,823,313 | 7/1974 | Unema . |
| 4,062,634 | 12/1977 | Rando et al. . |
| 4,160,939 | 7/1979 | Damouth et al. ........................ 359/218 |
| 4,251,798 | 2/1981 | Swartz et al. . |
| 4,293,218 | 10/1981 | Nielson et al. . |
| 4,426,694 | 1/1984 | Kimura . |
| 4,484,319 | 11/1984 | Koishi et al. . |
| 4,498,110 | 2/1985 | Unema . |
| 4,830,489 | 5/1989 | Cain et al. . |
| 5,010,242 | 4/1991 | Frontino . |
| 5,132,524 | 7/1992 | Singh et al. . |
| 5,151,581 | 9/1992 | Krichever et al. . |
| 5,221,832 | 6/1993 | Collins, Jr. et al. . |
| 5,294,784 | 3/1994 | Tooley et al. . |

FOREIGN PATENT DOCUMENTS

| | | |
|---|---|---|
| 0457548A3 | 5/1991 | European Pat. Off. . |
| 3105207 | 2/1991 | Japan . |

*Primary Examiner*—James Phan
*Attorney, Agent, or Firm*—Popham, Haik, Schnobrich & Kaufman, Ltd.

[57] ABSTRACT

A rotating laser apparatus having a reciprocating laser scanning system which facilitates visual recognition of a laser beam on an object to be measured by raising an effective energy level on the object. In the apparatus the laser beam is rotated by a rotation device. The reciprocating laser scanning system includes reflection members for reflecting the laser beam, a laser beam detector for detecting a return laser beam reflected from the reflection members, and a microcomputer for controlling a rotation of the rotation device in accordance with the output of the laser beam detector.

12 Claims, 12 Drawing Sheets

INJECTED LASER BEAM
REFLECTED LASER BEAM

INJECTED LASER BEAM
REFLECTED LASER BEAM

MARKING APPARATUS HAVING FEEDBACK-CONTROLLED ROTATIONAL LASER BEAM

This is a continuation of U.S. patent application Ser. No. 08/141,047, filed Oct. 26, 1993, now U.S. Pat. No. 5,517,023.

BACKGROUND OF THE INVENTION

I. Field of the Invention

The present invention relates to rotating laser apparatus having reciprocating laser scanning systems, and in particular relates to ones which are rotating laser apparatus used for marking, which project a laser beam onto an object and which include the reciprocating laser scanning system.

II. Description of the Prior Art

Conventionally, rotative irradiation type laser apparatus is disclosed in Japanese Patent Application Laid Opens No. SHO-62-95419 (1987) and No. SHO-63-179208 (1988). These apparatuses use He—Ne gas lasers or laser diodes or the like as a laser source.

The conventional rotative irradiation type laser using He—Ne gas laser has had a problem that, when a distance between the apparatus body and an object is great, marking with a high efficiency becomes difficult because the He—Ne gas laser arriving the object is attenuated in energy and is hardly visible.

In addition, the rotative irradiation type laser apparatus using laser diodes projects an infrared laser beam, which requires the location of an infrared light sensor on the object.

In the recent years, a laser diode capable of emitting a visual wavelength laser whose wavelength approximates that of the He—Ne gas laser has been proposed. However, the problem still remains wherein, when the distance between the apparatus body and an object is great, a marking operation with a high efficiency is difficult because the energy of the laser beam arriving at the object attenuated and hardly visible.

SUMMARY OF THE INVENTION

This invention has been made in view of the above problems connected with conventional rotative irradiation type laser apparatus. An object of the invention is to provide a laser rotative irradiation apparatus having a reciprocating laser scanning system making it easier to visually recognize the laser beam by raising the effective energy of the laser beam on the object.

In order to achieve the above object, the present invention is, in a laser rotative irradiation apparatus for rotatably irradiating a laser beam by a rotation device, a laser rotative irradiation apparatus having a reciprocating laser scanning system which includes a reflection means for reflecting a laser beam, a laser beam detecting means for detecting a return laser beam reflected from said reflection means, and a control means for controlling rotation of said rotation device in accordance with an output of said laser beam detecting means.

DETAILED DESCRIPTION OF THE PREFERRED EMBODIMENTS

Figure 1:
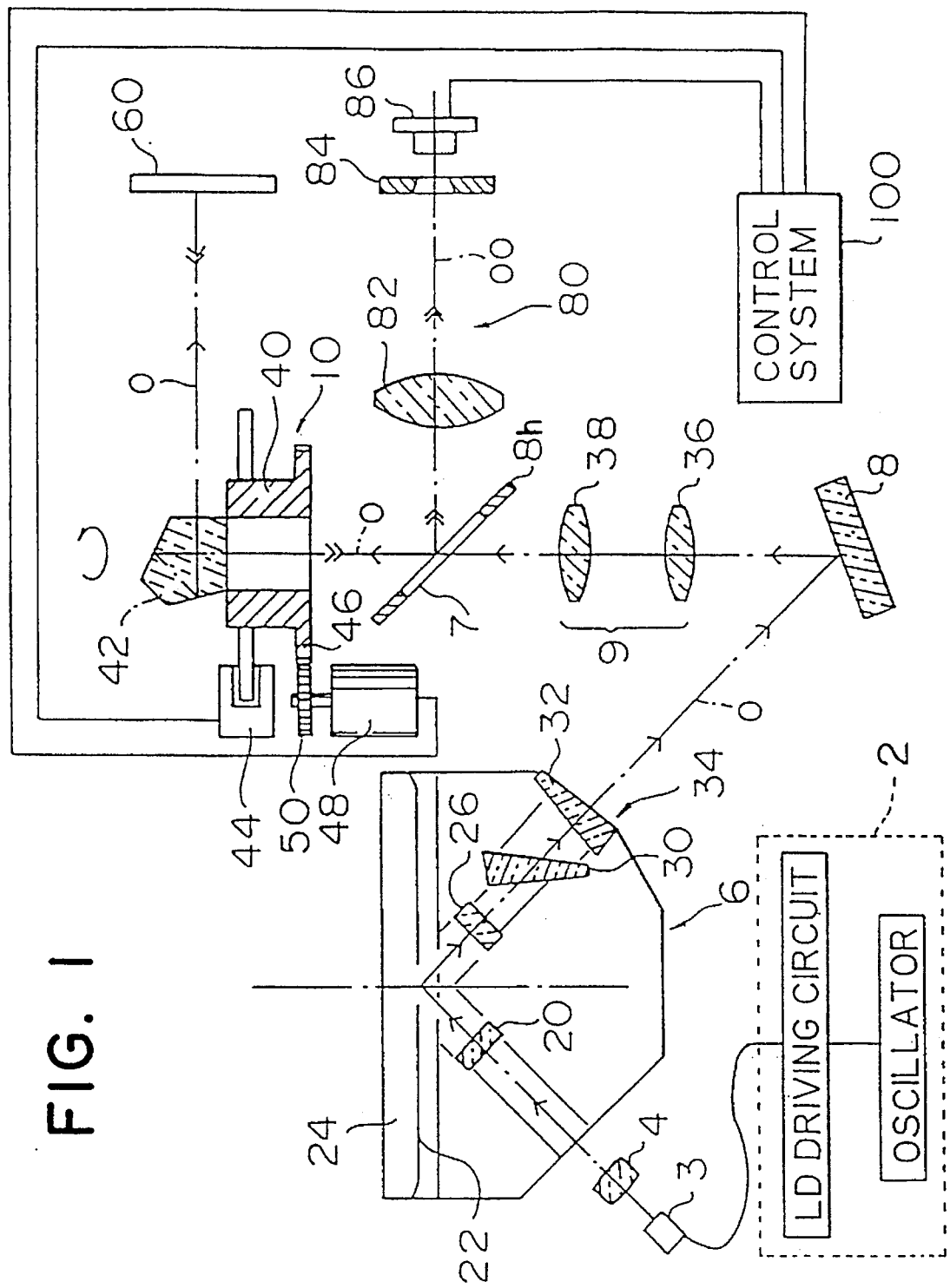
FIG. 1 is an optical diagram of a laser beam rotation apparatus having a reciprocating laser scanning system of an embodiment according to the present invention.

As shown in FIG. 1, a laser beam rotation apparatus having an optical system including a reciprocating laser scanning system comprising a collimator lens 4, a tilting angle compensating section 6, a reflection mirror 8, a beam expander 9, a perforated mirror 8h having a hole 7 for passing the beam, and a beam rotation section 10, all of which are located on an optical axis 0 of a laser beam irradiated from an LD light emitting section 2 including an LD3. The tilting angle compensation section 6 can be omitted from the apparatus.

The tilting angle compensating section 6 is a part of the optical system for reflecting a laser beam radiated from the LD light emitting section 2 in order to keep the laser beam projected vertically from the LD light emitting source 2, irrespective of the tilting angle of the main body (not shown), the tilting angle compensation section 6 comprises a seal glass 20, an oil bath 24 having a reflection surface 22 of the back side of the oil, a seal glass 26, and an optical axis adjusting section 34 comprising a pair of prism members 30 and for polarizing an optical axis. The beam expander 9 comprises a pair of lenses 36 and 38 having different focal lengths from each other, and which expands the width of the laser beam.

The beam rotation section 10 has a pentaprism 42 on a rotatable support table 40, so that the laser beam projected vertically upwardly is reflected horizontally thereby to form by rotational scanning a horizontal reference plane. An encoder 44 for detecting the direction of rotation of the rotatable support table 40 is attached at an intermediate portion of the rotatable support table 40. The lower portion of the rotatable support table 40 is provided with a gear 46 which engages with an output gear 50 of a motor 48 for driving the rotatable support table 40. The rotation of the motor 48 is controlled by a control system 100, which is connected to with encoder 44 and a photoelectric conversion element 86 of a laser beam detecting system 80, which is described later.

Figure 2:
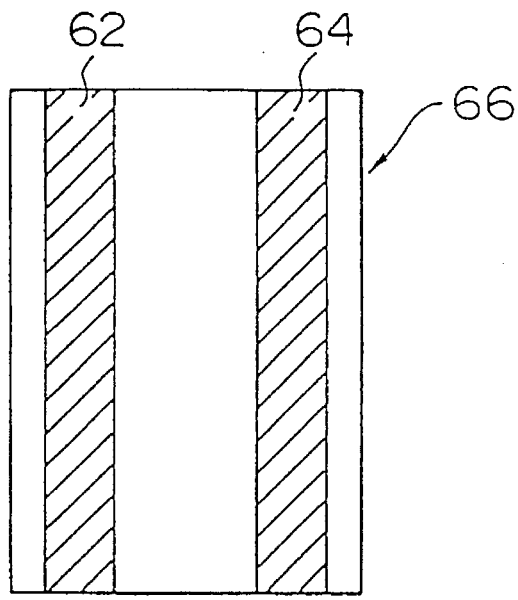
FIG. 2 is a front view of a reflection means of an embodiment according to the present invention.
Figure 3:
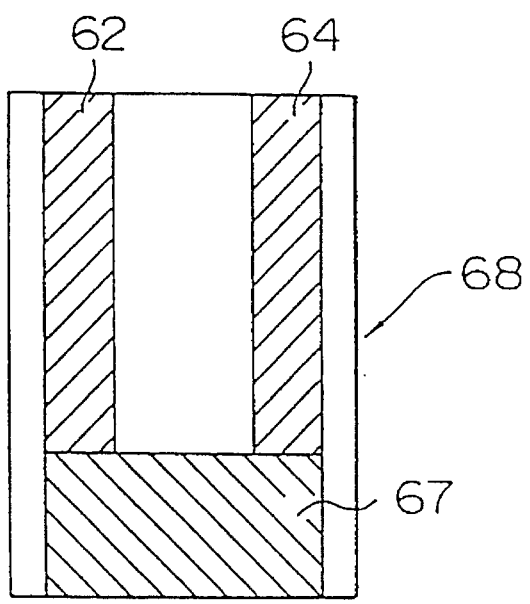
FIG. 3 is a front view of a reflection means of an embodiment according to the present invention.
Figure 4:
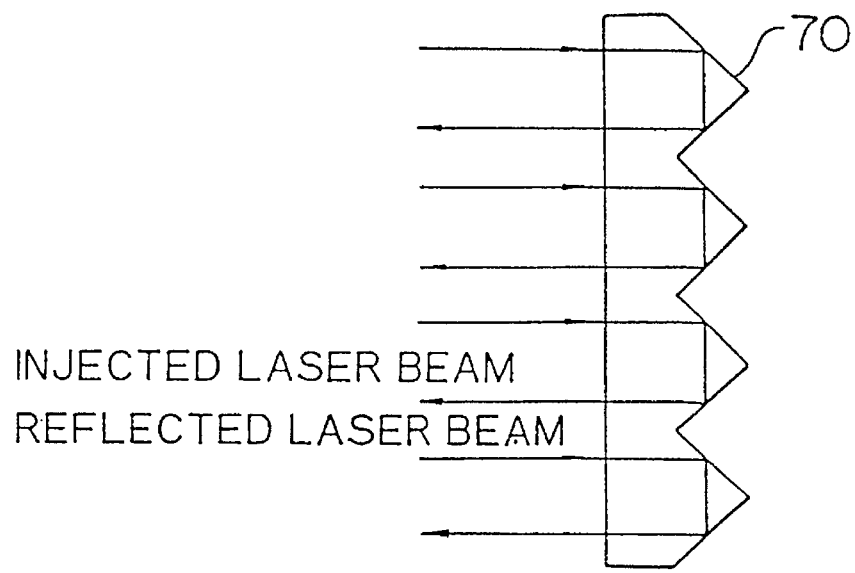
FIG. 4 is a sectional view of a reflection means of an embodiment according to the present invention.
Figure 5:
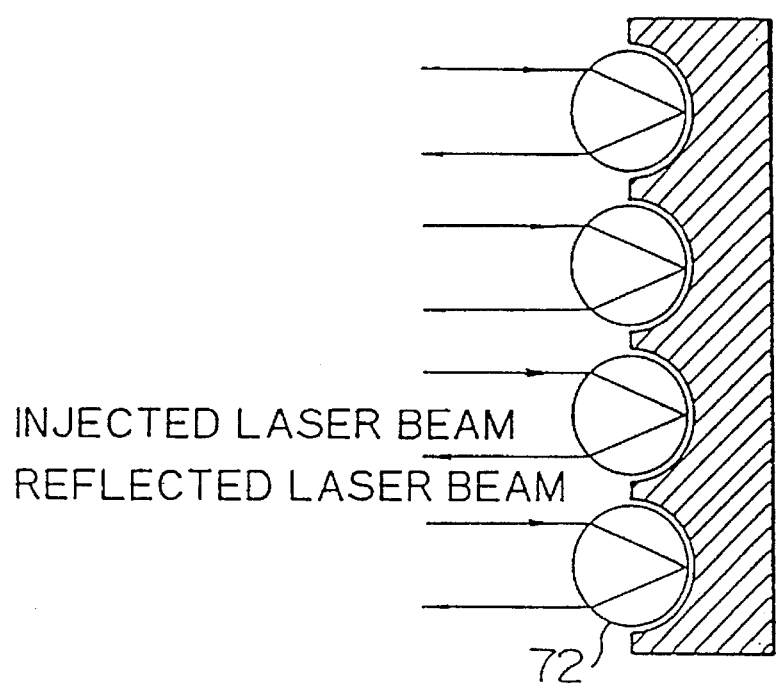
FIG. 5 is a sectional view of a reflection means of an embodiment according to the present invention.

A reflection means 60 for reflecting a laser beam is arranged on the object to be measured. The reflection means 60 is, as shown in FIG. 2, a first reflection member 66 arranged with two reflecting zones 62 and 64 extending vertically and having a space between them, or as shown in FIG. 3, a second reflecting member 68 arranged with two perpendicular reflection zones 62 and 64 extending vertically and having a space between them and another-patterned reflecting zone 67 at the bottom of reflection zones 62 and 64. The reflecting zones 62 and 64 and the reflecting zone 67 are provided on their backsides with a plurality of corner cubes 70 as shown in FIG. 4, or with a plurality of spherical reflectors 72 as shown in FIG. 5.

The laser beam detecting system 80 includes a condenser lens 82, a pinhole plate 84, and the photoelectric conversion element 86 which are located at suitable intervals on a reflection optical axis 00 of the perforated mirror 8.

Figure 6:
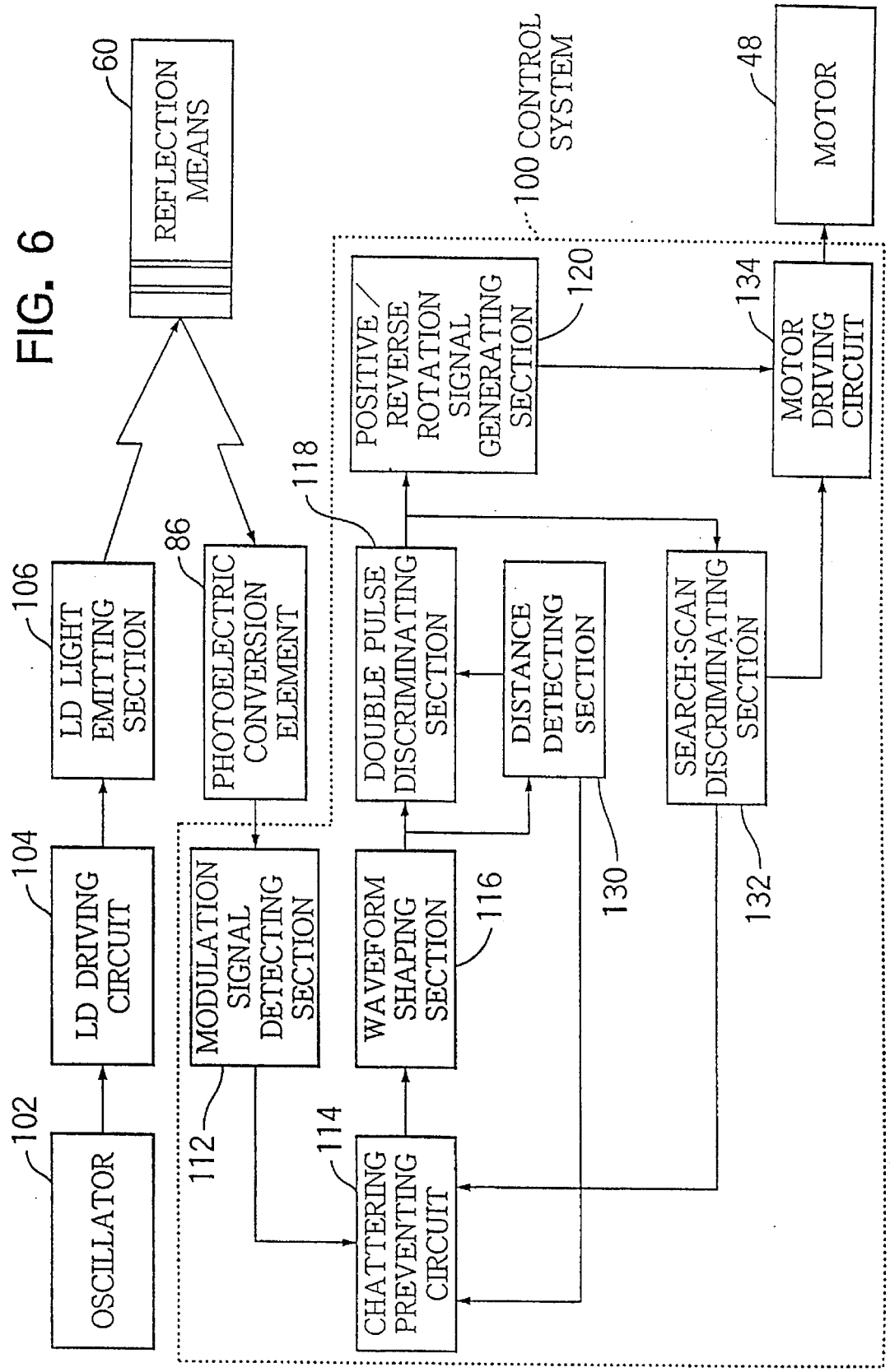
FIG. 6 is a block diagram of a control system of a first embodiment according to the present invention.

As shown in FIG. 6, an electrical system of the reciprocating laser scanning system includes an oscillator 102, a LD driving circuit 104 inputting an output of the oscillator 102, and a LD light emitting section 106 inputting an output of the LD driving circuit 104. The electrical system further includes the photoelectric conversion element 86 receiving a laser beam reflected from the reflecting means 60, the motor 48, and a control system 100. There is also an arrangement wherein an output of the encoder 44 is input to the control system 100.

FIRST EMBODIMENT OF CONTROL SYSTEM

The first embodiment of the control system 100 increases visibility of the laser beam by making the laser beam scan back and forth only in an angle between the two reflecting means 60. As shown in FIG. 6, the control system 100 includes a modulation signal detecting section 112 connected with the output of the photoelectric conversion element 86 for amplifying input signals, and a chattering preventing circuit 114 connected with the output of the modulation signal detecting section 112.

The output of the chattering preventing circuit 114 is connected to a motor driving circuit 134 through a waveform shaping section 116, a double pulse discriminating section 118 and a positive/reserve rotation signal generation section 120. The output of the waveform shaping section 116 is connected through a distance detecting section 130 to the double pulse discriminating section 118. The output of the double pulse discriminating section 118 is connected to the motor driving circuit 134 through a search-scan discriminating section 132. The outputs of the distance detecting section 130 and the search-scan discriminating section 132 are connected to the chattering preventing circuit section 114.

Figure 7:
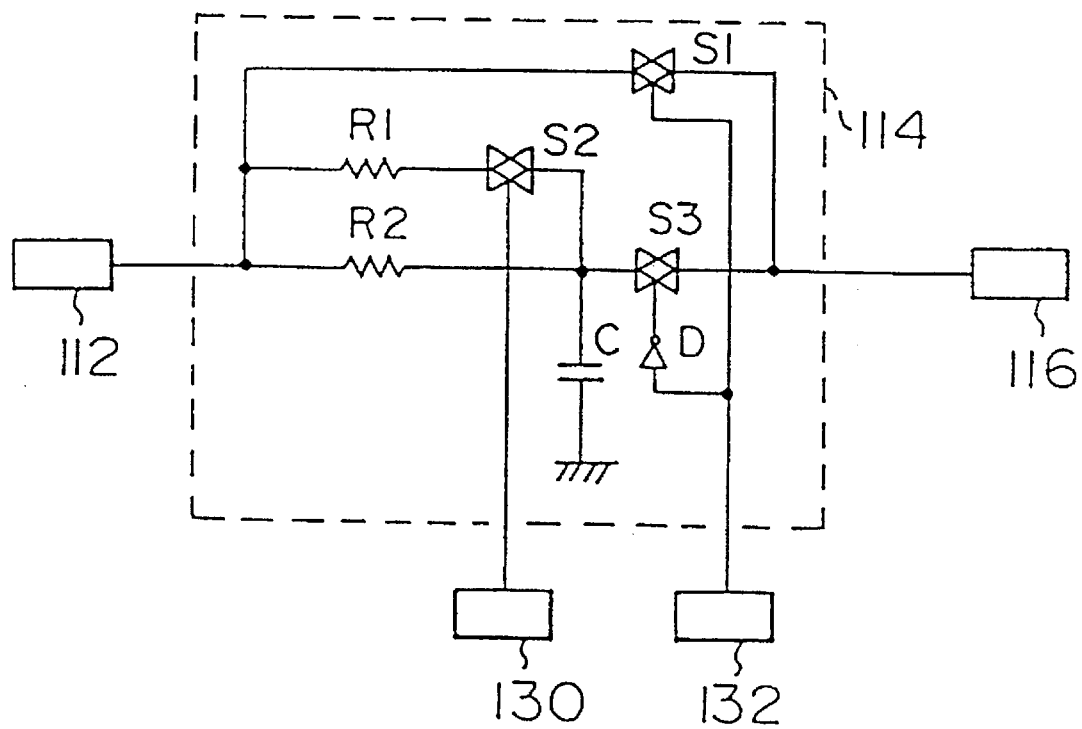
FIG. 7 is a circuit diagram of a chattering preventing unit of an embodiment according to the present invention.

The chattering preventing circuit section 114 prevents occurrence of chattering by adjusting a time constant of a RC filter circuit. The RC filter circuit is composed of resistances R1 and R2, analog switches S1, S2, and S3, an inverter I, and a capacitor C as shown in FIG. 7. In the chattering preventing circuit 114, when the distance between the main body (not shown) and the object is short, the detecting signal during scanning between the reflecting zones 62 and 64 becomes long and also the chattering time becomes long. Therefore, the time-constant for the RC filter circuit must be made long. On the contrary, when the distance between the main body (not shown) and the object is long, the detecting signal during scanning is short and also the chattering time becomes short. Therefore, the time-constant of the RC filter circuit must be made short. On the other hand, during searching when the laser beam scans the laser reference plane, the time required for a laser beam to travel between the reflection means 60 is short, and a possibility of generating chatterings of a return laser beam is less, hence the analog switches S1, S2, and S3 are operated so that the input signals bypass the RC filter circuit.

The distance detecting section 130 detects a distance between the main body (not shown) and the object based on the interval between double pulse signals generated by the two vertical reflection zones 62 and 64 of the reflection means 60, and then changes the time constant of the chattering preventing circuit 114. The double pulse discriminating section 118 determines whether the interval between input of first and second pulses is shorter than a predetermined time set for searching or scanning. If the interval is determined to be shorter than the predetermined time, one pulse is generated and output to the positive/reverse rotation signal generating section 120 and the search-scan discriminating section 132.

Using the output signals from the double pulse decision section 118, the search-scan discriminating section 132 determines whether it is in a search step or a scan step, and its resultant pulse signals be outputted to the chattering preventing circuit 114. The positive/reverse rotation signal generating circuit 120, which is formed of a frequency dividing circuit, switches positive rotation signals and reverse rotation signals every time it receives the pulse from the double pulse discriminating circuit 118 and outputs the signals to the motor driving circuit 134.

The motor driving circuit 134 controls the rotating direction of the motor 48 by positive rotation signals and reverse rotation signals from the positive/reverse rotation signal generating circuit 112, and controls the rotational speed based on the signal from the search-scan decision section 132. That is, the control acts to make the rotational speed of the laser beam in the search made faster than the rotational speed of the laser beam in the scan mode.

SECOND EMBODIMENT OF CONTROL SYSTEM

Figure 8:
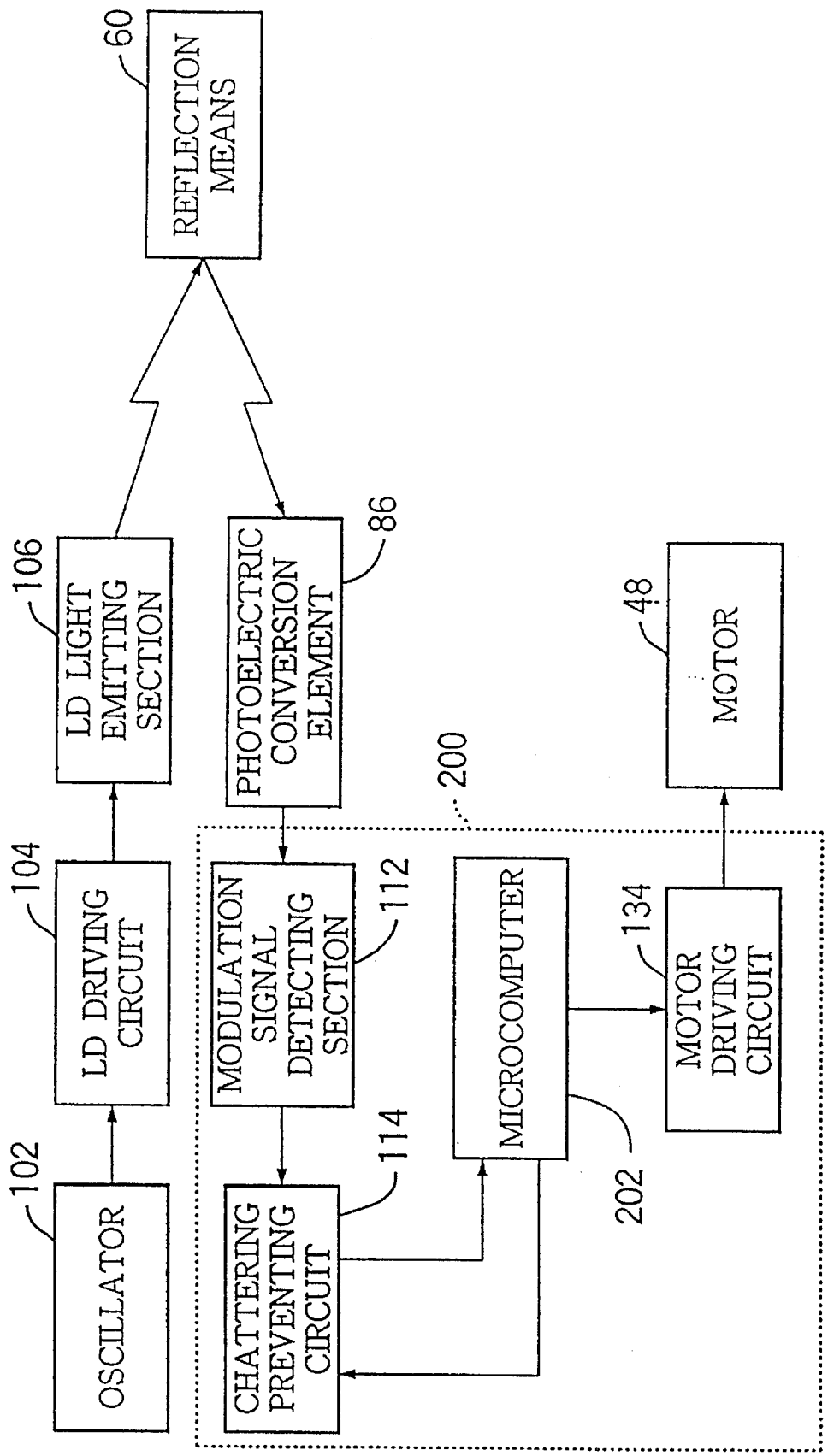
FIG. 8 is a block diagram of a control system of the embodiment 2 according to the present invention.

A control system 200 of the second embodiment, as in the first embodiment, facilitates visibility of a laser beam on an object by scanning the laser beam back and forth only in an angle between the two reflection zones 62 and 64. In the control system 200 in FIG. 8, the same reference numerals are given to the same elements as those shown in the first embodiment and the explanation thereof is omitted accordingly. The output of a chattering preventing circuit 114 is outputted to a motor driving circuit 134 through a microcomputer 202.

Figure 9:
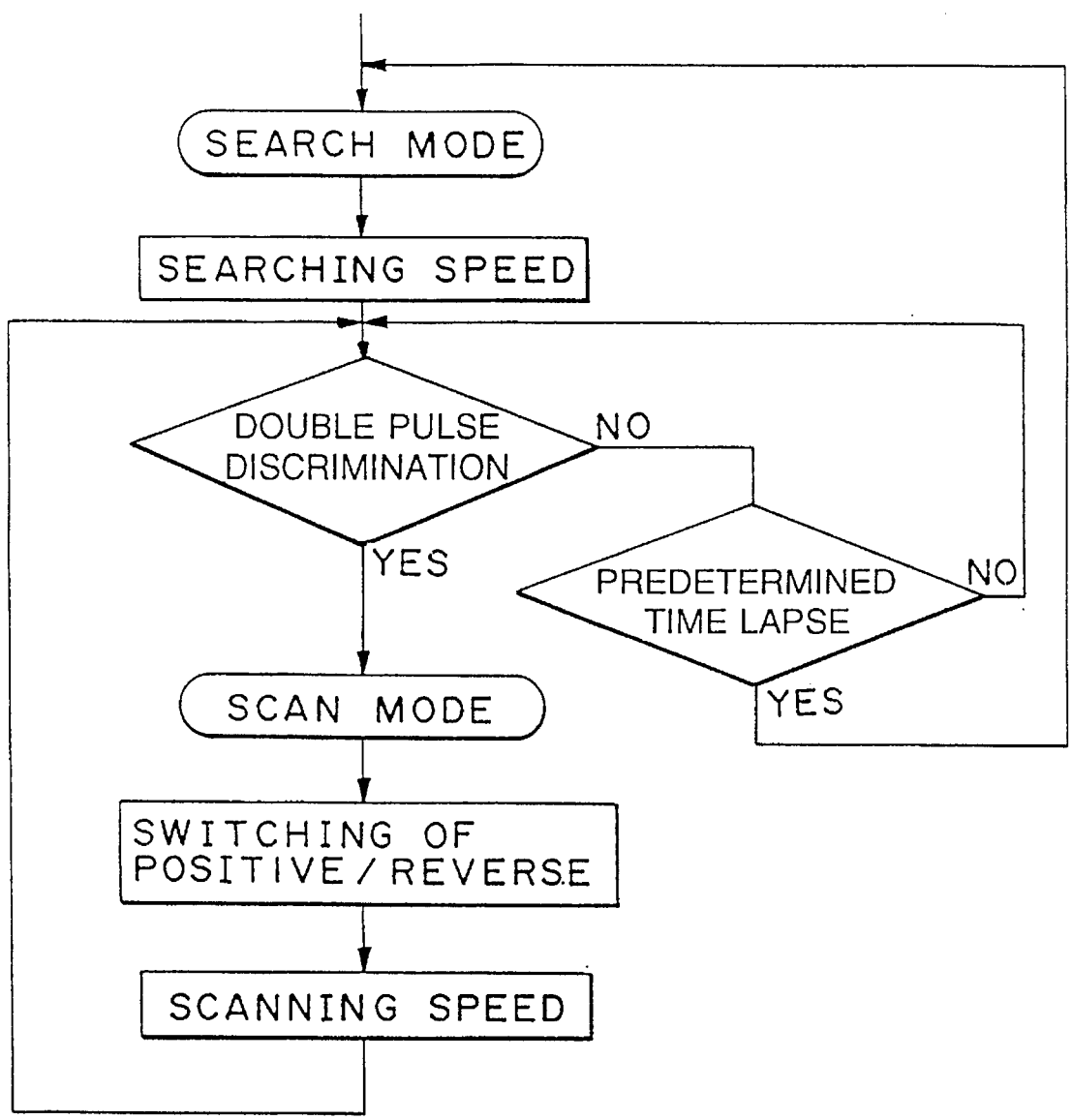
FIG. 9 is a flow chart of a microcomputer for a control system of a second embodiment according to the present invention.

The microcomputer 202, when it is in a search mode, operates to make the beam rotation system 10 rotate the laser beam at a speed of 60 rpm as shown in a flow chart of FIG. 9. Then, in a double pulse discriminating step, it is determined whether the input signal from the reflection means 60 is a double pulse or not.

If it is determined that it is a double pulse in the double pulse discriminating step, the microcomputer 202 is switched to a scan mode in which it reverses the direction of rotation of the motor 48, and controls the beam rotation system 10 to operate at a scan mode rotational speed which is slower than the rotational speed in search mode. If it is determined that it is not a double pulse, and the predetermined time in the search mode has not yet lapsed, it is returned to the double pulse discriminating step. If the predetermined time in the search mode has lapsed, it is returned to the search mode.

THIRD EMBODIMENT OF CONTROL SYSTEM

Figure 10:
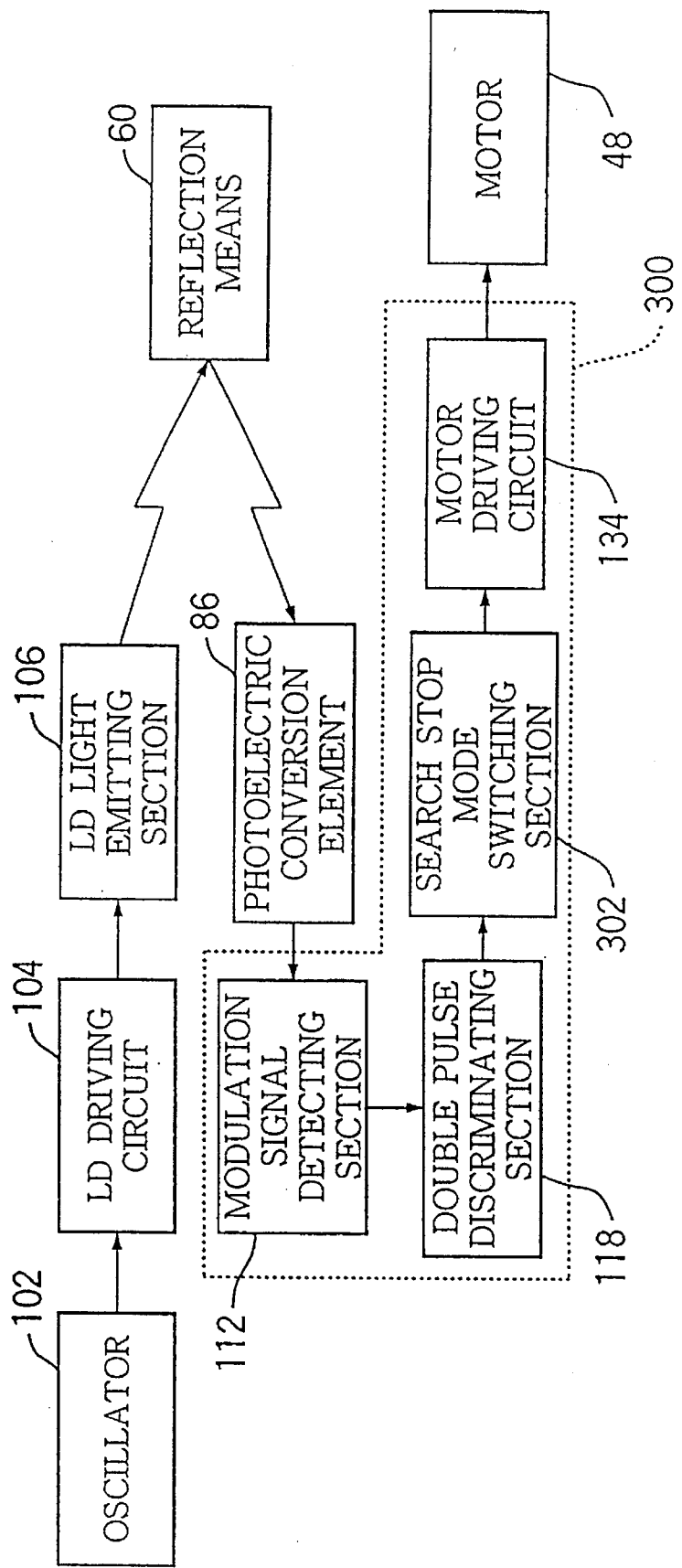
FIG. 10 is a block diagram of a control system of a third embodiment according to the present invention.

A control system 300 of the third embodiment 3 facilitates visibility a laser beam by stopping the laser beam on one of the two reflection zones 62 and 64. In the control system 300, as shown in FIG. 10, an output of a modulation signal detecting section 112 is inputted into a motor driving circuit 134 through a double pulse discriminating section 118 and a search-stop mode switching section 302. When the double pulse discriminating section 118 detects a double pulse within a predetermined scanning or searching time, the search-stop mode switching section 302 outputs motor signals to the motor driving circuit 134 to stop the rotation of the beam rotation system 10 during a predetermined time.

FOURTH EMBODIMENT OF CONTROL SYSTEM

Figure 11:
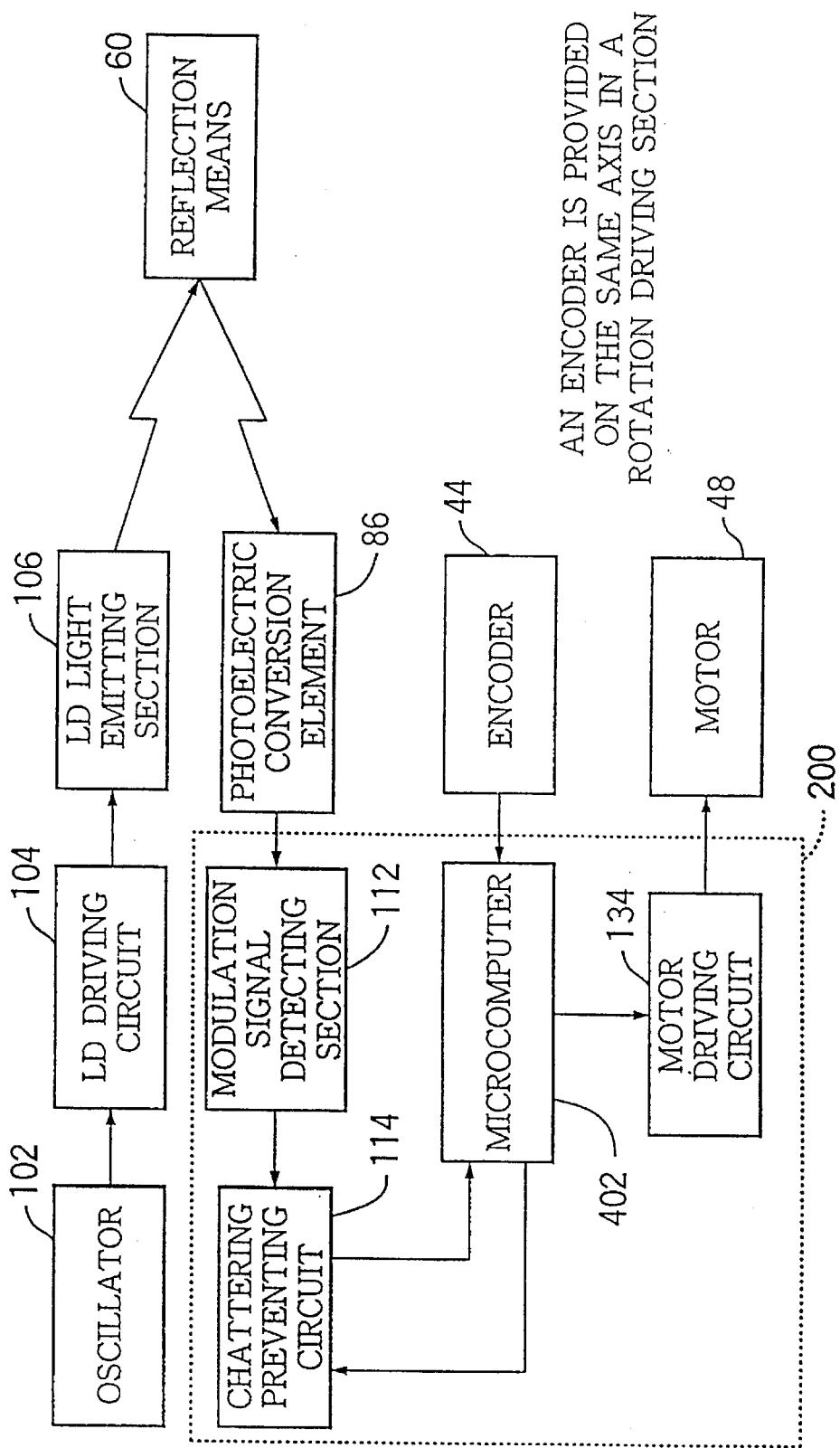
FIG. 11 is a block diagram of a control system of a fourth embodiment according to the present invention.

A control system 400 of the fourth embodiment, as in the third embodiment, increases visibility of a laser beam by stopping the laser beam on one of the two reflection zones 62 and 64. In the control system 400, as shown in FIG. 11, the same reference numerals are given to the same elements as those Shown in the first embodiment and the explanation thereof is omitted accordingly. The output of the chattering preventing circuit 114 is outputted to the motor driving circuit 134 through a microcomputer 402. An output of an encoder 44 is inputted the microcomputer 402.

Figure 12:
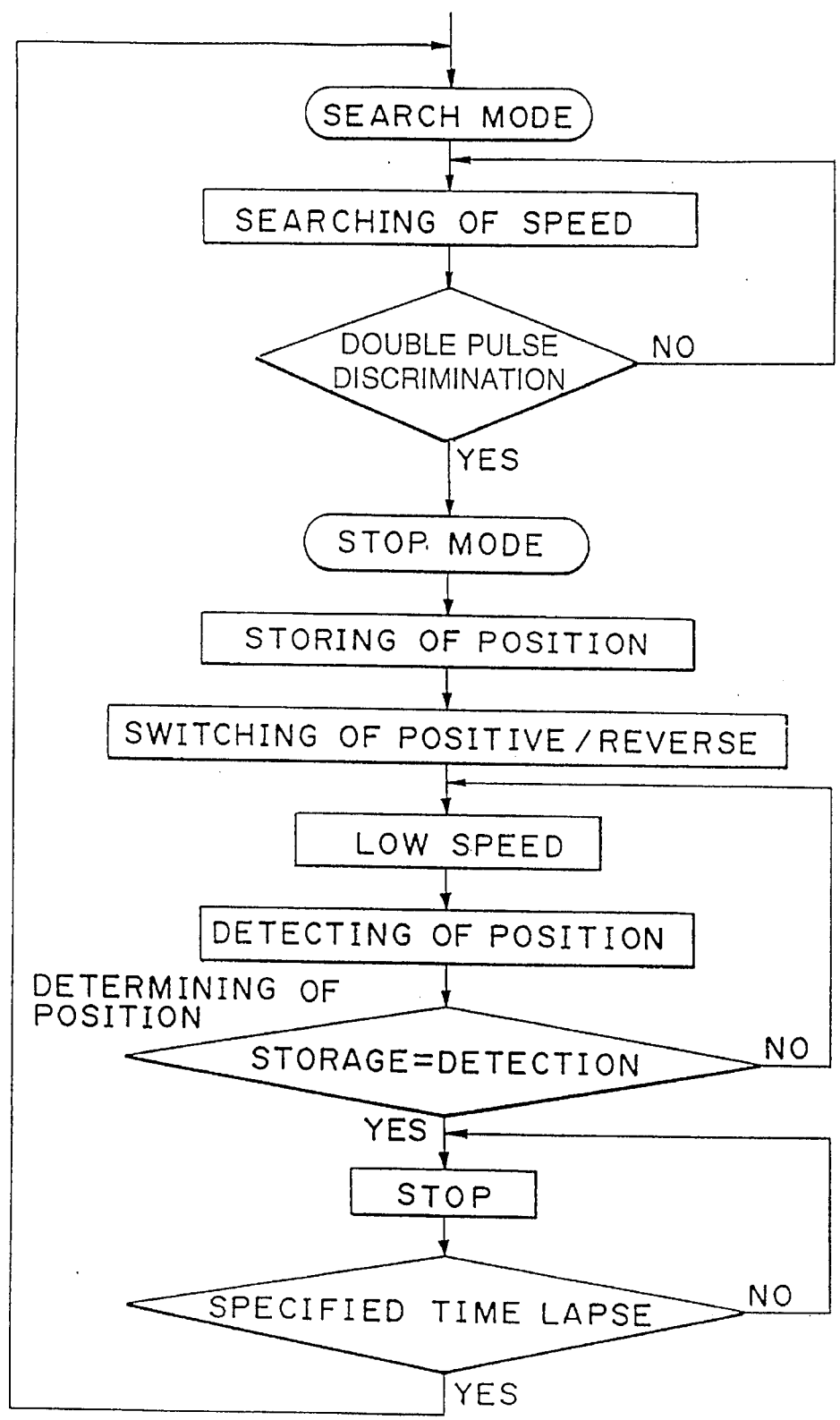
FIG. 12 is a flow chart of a microcomputer for control system of the fourth embodiment according to the present invention.

The microcomputer 402 of the control system 400, when in a search mode, operates to make the beam rotation system 10 rotate the laser beam at a rotational speed of 60 rpm as shown in a flow chart of FIG. 12. Then, in the double pulse decision step, it is determined whether an input signal from the reflection means 60 is a double pulse or not.

In the double pulse decision step, if it is determined that the input signal is a double pulse, the microcomputer 402 stores the rotating direction of the beam rotation system 10 at that time on the basis of the output of the encoder 44. Next, the rotational direction of the beam rotation system 10 is reversed and the rotational speed thereof is made slower than in the search mode. The beam rotation system 10 performs low speed reverse rotation to return it to the stored position and to stop for the predetermined time. After the beam rotation system 10 has been stopped for the predetermined time, the search mode is started again. In the double pulse discriminating step, if a double pulse is not received, then it returns to the search mode.

FIFTH EMBODIMENT OF CONTROL SYSTEM

Figure 13:
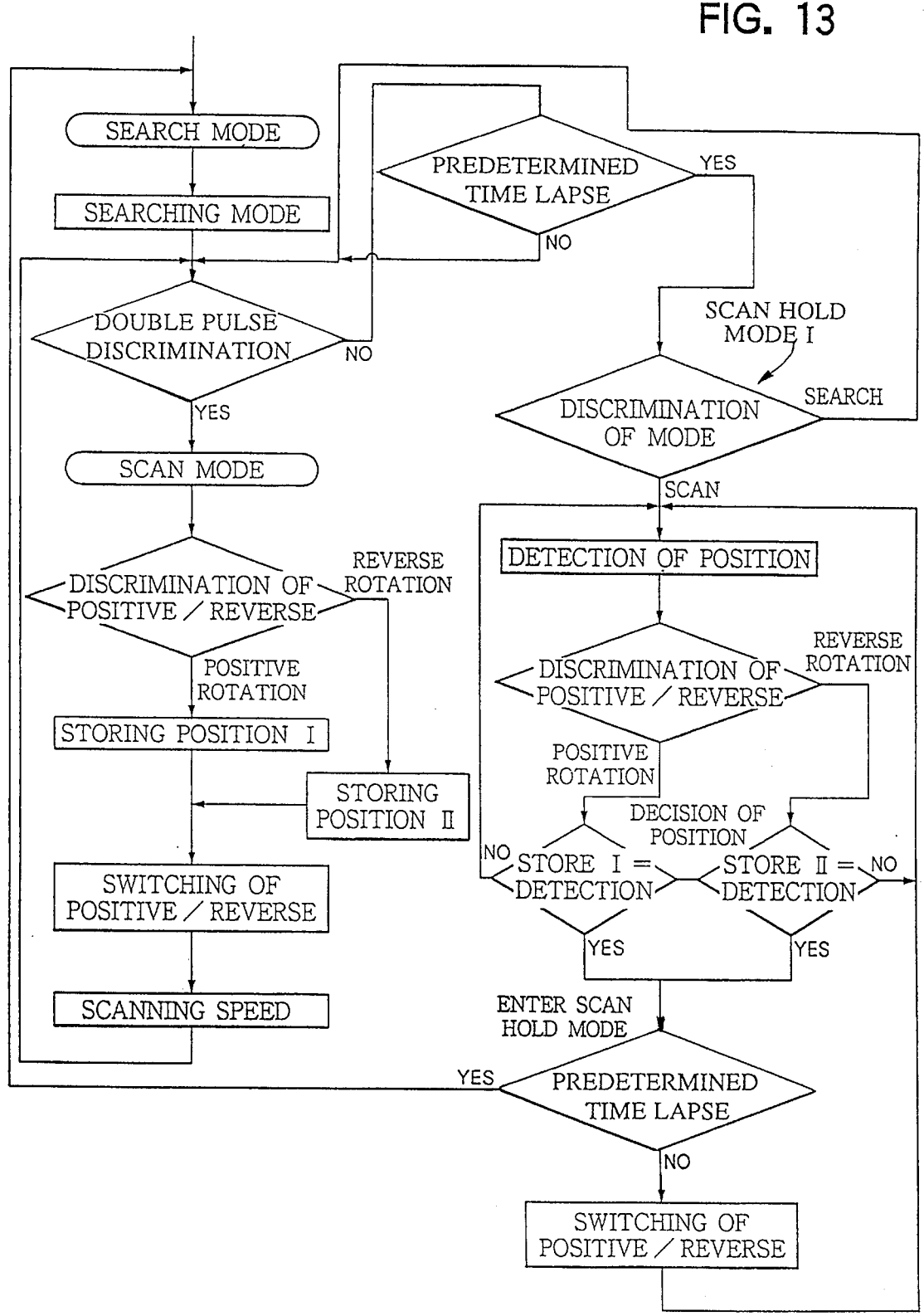
FIG. 13 is a flow chart of a microcomputer for control system of a fifth embodiment according to the present invention.

A control system of the fifth embodiment, as in the first embodiment, increases visibility of a laser beam by scanning the laser beam back and forth only in an angular range between the two reflection means 60. However, the angular positions of the two reflection zones 62 and 64 are stored and the reciprocating scanning of the laser beam is temporarily continued even if the reflection zones 62 and 64 are removed or the return laser beam is temporarily interrupted. The control system of the fifth embodiment is the same as in the fourth embodiment except for the operation of the microcomputer 402. A microcomputer of the fifth embodiment, as shown in FIG. 13, when it enters into the search mode, operates to make the beam rotation system 10 rotate at a search speed of 60 rpm. Next, in the double pulse discriminating step, it is determined whether input signals from the reflection zones 62 and 64 are double pulses or not.

If it is determined that the signals are double pulses in the double pulse discriminating step, it proceeds to a positive/reverse discriminating step. In the case either of a positive or reverse decision in the positive/reverse discriminating step, the angular position I or II of the beam rotation system 10 at that time is stored in accordance with the output of the encoder 44. Thereafter, the direction of rotation of the beam rotation system 10 is reversed and the speed thereof is adjusted to rotate the beam rotation system 10 in the scan mode at a low rotational speed.

In the double pulse discriminating step, if it is determined that input signals from the reflection means 60 are not double pulses and further that a predetermined time has lapsed, then it proceeds to a scan hold mode I. If it is determined that the predetermined time has not yet lapsed, it returns to the double pulse discriminating step. In scan hold mode I it is determined whether it is in the search mode or the scan mode. That is, in the mode decision step, if it is determined that it is a scan mode, the rotation direction and angular position of the beam rotation system 10 are detected based on the output of the encoder 44.

Then, in the positive/reverse discriminating step, if it is determined that it is a positive rotation, the angular position of the beam rotation system 10 is compared with the stored angular position I, and if it is determined that it is a reverse rotation, then the angular position of the beam rotation system 10 is compared with the stored angular position II. When the angular position of the beam rotation system 10 coincides with the stored angular position, it is determined whether or not a predetermined time has lapsed. If it is determined that the predetermined time has lapsed, it is returned to the search mode, and if it is determined that the predetermined time has not yet lapsed, it is returned to the step for detecting the direction of rotation and angular position of the beam rotation system 10. If the beam rotation system 10 is determined to be in positive rotation, then its angular position is compared to the stored angular position I, and if it is determined that it is a reverse rotation direction, then the direction of rotation and angular position of the beam rotation system 10 are compared to the stored angular position II. If the angular position of the beam rotation system 10 is not coincident with the stored angular position, it is returned to the step for detecting the rotation direction and the rotation position of the beam rotation system 10 in accordance with the output of the encoder 44.

SIXTH EMBODIMENT OF CONTROL SYSTEM

A control system of the sixth embodiment, as in the first embodiment, increases visibility of a laser beam by scanning the laser beam back and forth only in an angular range between the two reflection zones 62 and 64. In this arrangement, if the double pulses have not been detected during scanning, it moves to the search mode, and if a single pulse has been detected, it proceeds to the scan hold mode II. The scan hold mode II stores the angular position of the two reflection zones 62 and 64 to scan within the angular range unless it advances to the scan mode by detecting the double pulse. The double pulse is detected by an interrupt operation because it is difficult to detect whether or not the reflection zones 62 and 64 are located in the laser reference plane in the scanning step of the scan hold mode II.

Figure 14:
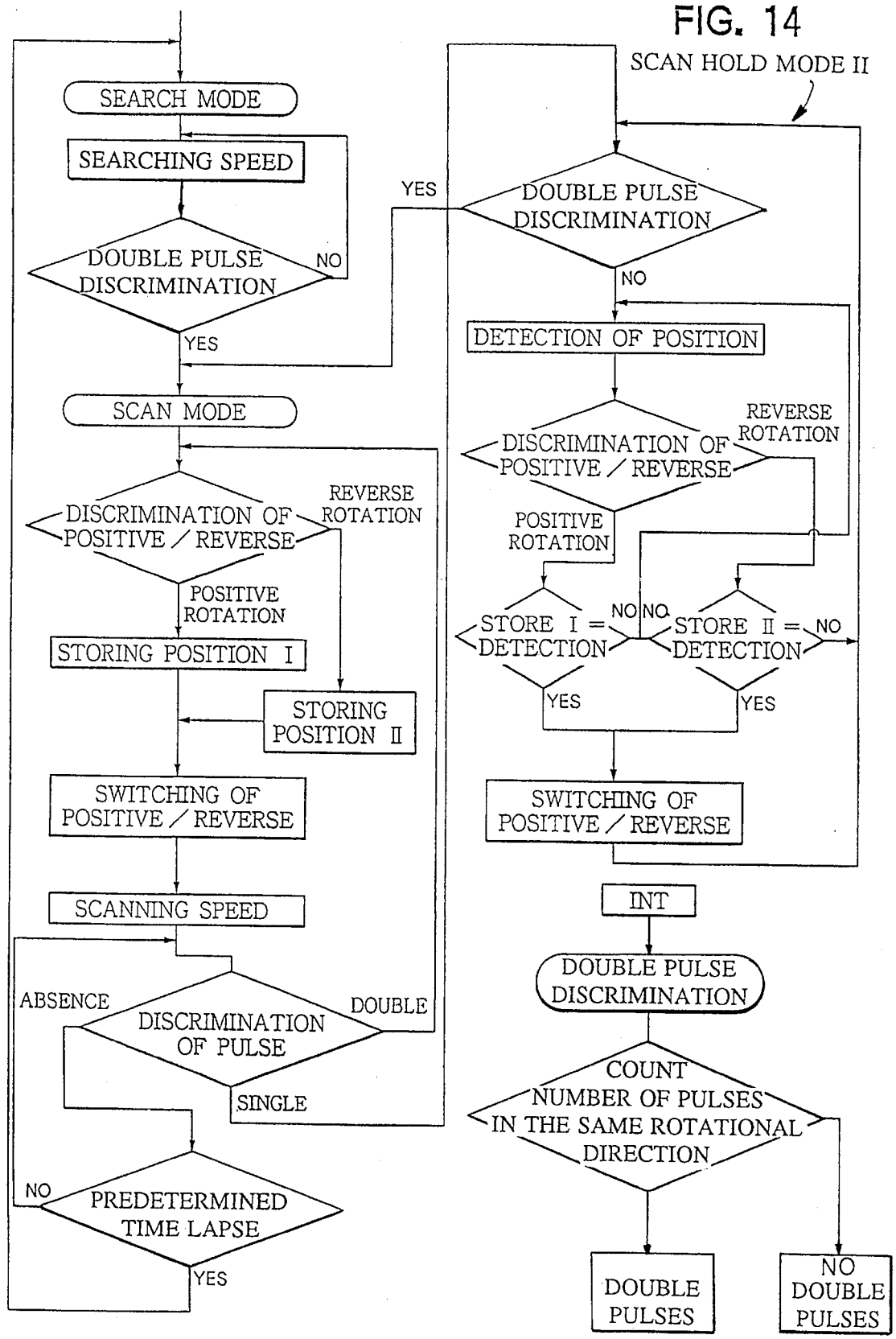
FIG. 14 is a flow chart of a microcomputer for control system of a sixth embodiment according to the present invention.

That is, as shown in the lower right of the flow chart of FIG. 14, in the scan hold mode II, under the condition where reciprocating laser scanning is performed, in the case where a double pulse is detected within the time that the motor rotates in one direction, the result of the double pulse discriminating step is YES; otherwise, it is NO. It executes the interrupt-process such that decision results are carried out depending on the double decision result of the scan hold mode II. The control system of the sixth embodiment is the same as the fourth embodiment except for the operation of the microcomputer 402. The microcomputer of the sixth embodiment operates, as shown in FIG. 14, when entering in the search mode, to rotate the beam rotation system 10 at a search speed of 60 rpm. Next, in the double pulse discriminating step, it is determined whether or not input signals from the reflection means 60 are the double pulse.

In the double pulse discriminating step, if it is determined to be a double pulse, it proceeds to the positive/reverse discriminating step, and then the rotational positions I and II of beam rotation system 10 at that time are stored in accordance with the output of the encoder 44. Thereafter, the rotating direction of the beam rotation system 10 is switched to rotate the beam rotation system 10 in the scan mode at a lower rotational speed.

Following this, a pulse decision is performed in the pulse discriminating step. If no pulse is detected in the pulse discriminating step and a predetermined time has lapsed, it returns to the search mode. If no pulse is detected and the predetermined time has not lapsed, it returns to the pulse discriminating step. If a single pulse is detected in the pulse discriminating step, it proceeds to the scan hold mode II.

If a double pulse is detected in the pulse discriminating step, it proceeds to the positive/reverse discriminating step.

A double pulse discrimination is executed in the scan hold mode II. If it is determined that it is not a double pulse, the rotation direction and rotation position of the beam rotation system 10 are detected in accordance with the output of the encoder 44. In the positive/reverse discriminating step, if it is determined to be positive rotation, the rotation position of the beam rotation system 10 is compared with the stored angular rotation position I, and if it is determined to be reverse rotation, the rotation position of the beam rotation system 10 is compared with the stored angular rotation position II. If these are coincident with each other, the positive/reverse rotating direction is switched to return to the step where the double pulse discrimination is executed.

Since the present invention is constituted as explained above, by performing the controls for reducing, stopping or reciprocating the scanning speed on the object of the laser beam, a substantial energy of the laser beam on the object can be raised, thereby making the visual recognition of said laser beam easy.

In the embodiments of the present invention, even if the reflection means becomes nonexistent in the laser reference plane, the laser beam continues to be projected on the object until the predetermined time lapses, so that the operation of visual recognition of the laser beam can effectively be performed. In addition, by using a modulated laser beam, by arranging a pinhole diaphragm in a detecting system for the return laser beam, or by using reflection members having a high directivity, it is possible to obtain less noisy signals, and a stable operation can be maintained.

Further, a returning light from the reflection means and reflection light from the external reflection object are distinguished by having at least two reflection members or zones included inside the reflection means. In addition, the laser beam projecting means and the laser beam detecting means have a partially common optical system, and further perforated mirrors are arranged in the common optical system, thereby the rotational laser apparatus having a simplified construction and a compact size can be obtained.

What is claimed is:

1. A laser beam irradiation apparatus comprising:

a laser source for emitting a laser beam;

laser beam projecting means for projecting the laser beam;

scanning means for moving said laser beam projecting means and scanning the laser beam along a laser scanning path;

reflecting means having at least one reflection zone for reflecting an incident laser beam projected by said projecting means in a direction substantially parallel to the incident laser beam;

laser beam detecting means for detecting a return laser beam reflected from said reflecting means in a direction substantially parallel to the incident laser beam and producing an output based on detection of the return laser beam; and control means for controlling movement of said scanning means and for pausing the scanning of the laser beam on said reflecting means based on said output from said laser beam detecting means.

2. The laser beam irradiation apparatus of claim 1, wherein said reflecting means includes first and second reflection zones having a space therebetween along said laser scanning path.

3. The laser beam irradiation apparatus of claim 1, wherein said control means functions to reverse the rotation of said scanning means and pause the scanning of the laser beam on said reflecting means in accordance with said output of said laser beam detecting means when said laser beam detecting means detects two pulses reflected from said reflecting means.

4. The laser beam irradiation apparatus of claim 1, wherein said control means functions to pause the scanning of the laser beam on said reflecting means in accordance with said output of said laser beam detecting means when said laser beam detecting means detects two pulses reflected from said reflecting means.

5. The laser beam irradiation apparatus of claim 1, wherein said laser source emits a visible light so that the paused laser beam is usable as a reference light beam.

6. The laser beam irradiation apparatus of claim 1, wherein said at least one reflection zone is a retroreflective member.

7. A laser beam irradiation apparatus comprising:

a laser source for emitting a laser beam;

laser beam projecting means for projecting the laser beam;

scanning means for moving said laser beam projecting means and scanning the laser beam along a laser scanning path;

reflecting means having at least one reflection zone for reflecting an incident laser beam projected by said projecting means in a direction substantially parallel to the incident laser beam;

laser beam detecting means for detecting a return laser beam reflected from said reflecting means in a direction substantially parallel to the incident laser beam and producing an output based on detection of the return laser beam; and control means for controlling movement of said scanning means and for pausing the scanning of the laser beam on said reflecting means.

8. The laser beam irradiation apparatus of claim 7, wherein said reflecting means includes first and second reflection zones having a space therebetween along said laser scanning path.

9. The laser beam irradiation apparatus of claim 7, wherein said control means functions to reverse the rotation of said scanning means and pause the scanning of the laser beam on said reflecting means in accordance with said output of said laser beam detecting means when said laser beam detecting means detects two pulses reflected from said reflecting means.

10. The laser beam irradiation apparatus of claim 7, wherein said control means functions to pause the scanning of the laser beam on said reflecting means in accordance with said output of said laser beam detecting means when said laser beam detecting means detects two pulses reflected from said reflecting means.

11. The laser beam irradiation apparatus of claim 7, wherein said laser source emits a visible light so that the paused laser beam is usable as a reference light beam.

12. The laser beam irradiation apparatus of claim 7, wherein said at least one reflection zone is a retroreflective member.

* * * * *